United States Patent [19]
Suzuki

[11] Patent Number: 5,896,171
[45] Date of Patent: Apr. 20, 1999

[54] VIDEO SIGNAL PROCESSING APPARATUS TO MULTIPLEX A VIDEO AND CONTROL SIGNAL

[75] Inventor: Yasuo Suzuki, Kamakura, Japan

[73] Assignee: Canon Kabushiki Kaisha, Tokyo, Japan

[21] Appl. No.: 08/792,368

[22] Filed: Feb. 3, 1997

[30] Foreign Application Priority Data

Feb. 6, 1996 [JP] Japan ................................ 8-042207
Dec. 27, 1996 [JP] Japan ................................ 8-349528

[51] Int. Cl.$^6$ ............................................ H04N 5/225
[52] U.S. Cl. .................... 348/211; 348/212; 348/478; 327/409; 327/412
[58] Field of Search .................... 348/4, 343, 478, 348/479, 489, 211, 212, 15, 705, 65; 327/407, 409, 412; 370/535, 537

[56] References Cited

U.S. PATENT DOCUMENTS

3,604,950  9/1971  Anderson ................. 327/409
4,225,886  9/1980  Smith ...................... 348/211
4,570,163  2/1986  Smith ...................... 348/211

*Primary Examiner*—Wendy Garber
*Assistant Examiner*—Andrew D. Martin
*Attorney, Agent, or Firm*—Morgan & Finnegan

[57] ABSTRACT

A video signal processing apparatus of the invention has an image pickup unit for picking up an image of an object and generating a video signal corresponding to the picked-up object image, a signal processing unit for executing various kinds of signal processes to the video signal which is generated from the image pickup unit, and a cable for electrically connecting the image pickup unit and the signal processing unit. In order to transmit and receive a data signal between the image pickup unit and the signal processing unit through the cable, for a predetermined period of time of the video signal which is transmitted from the image pickup unit to the signal processing unit through the cable, a plurality of kinds of video signals of different DC potentials are switched and outputted in accordance with the data signal, thereby multiplexing the data signal to the video signal. Thus, a function for multiplexing the data signal to the video signal and transmitting the multiplexed signal can be realized by a circuit of a cheap and simple construction of a small scale.

10 Claims, 8 Drawing Sheets

VIDEO SIGNAL PROCESSING APPARATUS TO MULTIPLEX A VIDEO AND CONTROL SIGNAL

BACKGROUND OF THE INVENTION

1. Field of the Invention

The invention relates to a video signal processing apparatus having a function for multiplexing a data signal to a video signal and transmitting the resultant signal.

2. Related Background Art

In recent years, a television conference system is shifting from a large scale system to a small scale and personal system such as a desk-top type system or the like. A video camera which is used as input means of an image in the above television conference system, a monitoring camera, or the like is also shifting to a camera of a small size and a low price.

In the field of the small video camera, therefore, a video camera of a camera head separating type is a main stream. Namely, it has a form such that an image pickup unit and a signal processing unit are separated through a cable. A camera head serving as an image pickup unit is constructed by an image pickup device such as a CCD (Charge Coupled Device) or the like and simple processing circuits such as sample and hold circuit, gain control circuit, and the like, thereby realizing a miniaturization. A signal processing board serving as a signal processing unit is constructed by a video signal processing circuit, a white balance control circuit, an image data compressing circuit, an interface circuit with a personal computer (hereinafter, simply abbreviated to a "PC"), and the like, thereby realizing a miniaturization.

Figures 1, 1A:
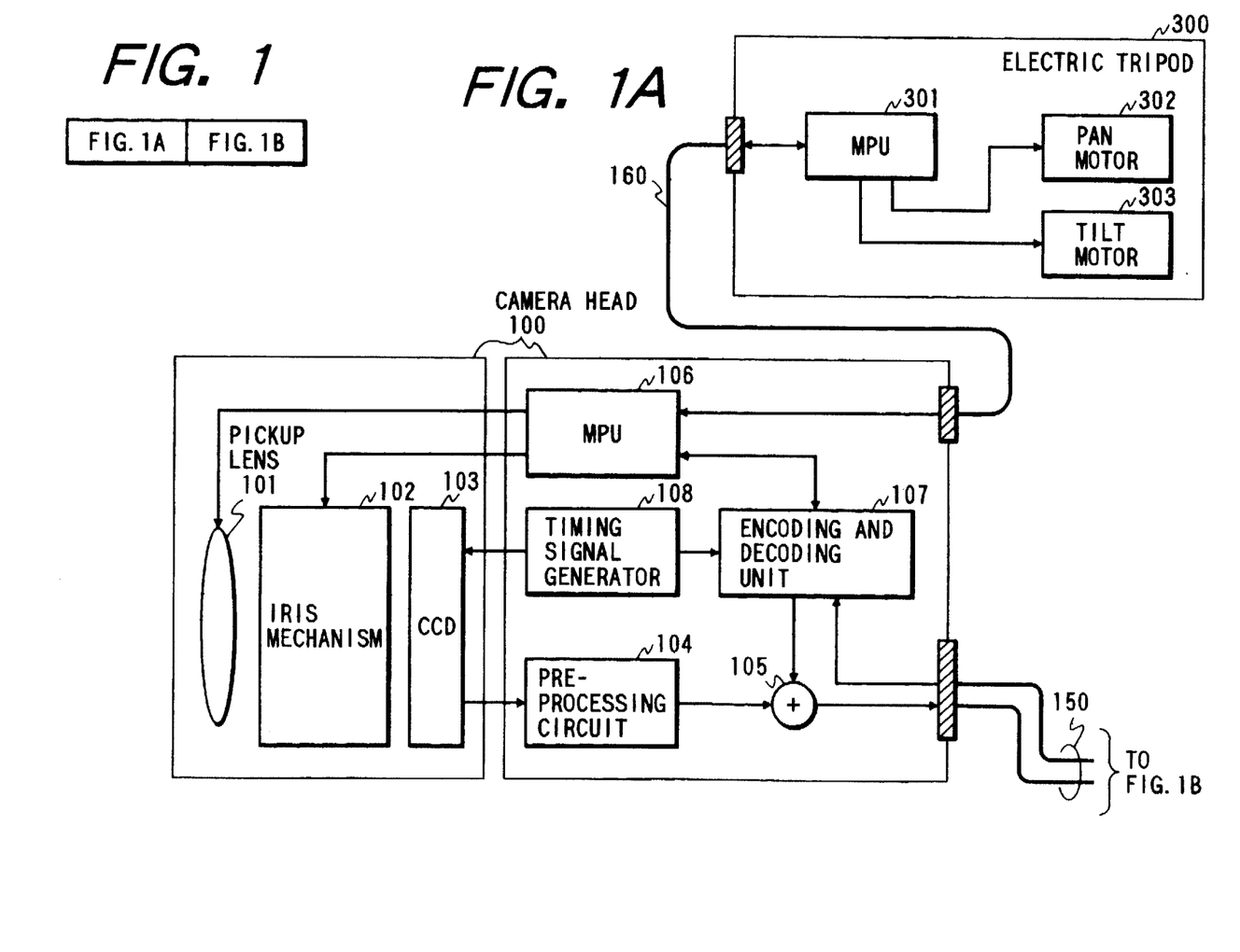
FIG. 1 is comprised of FIGS. 1A and 1B showing constructional block diagrams of a desk-top type television conference system using a conventional video camera of a camera head separating type.
Figure 1B:
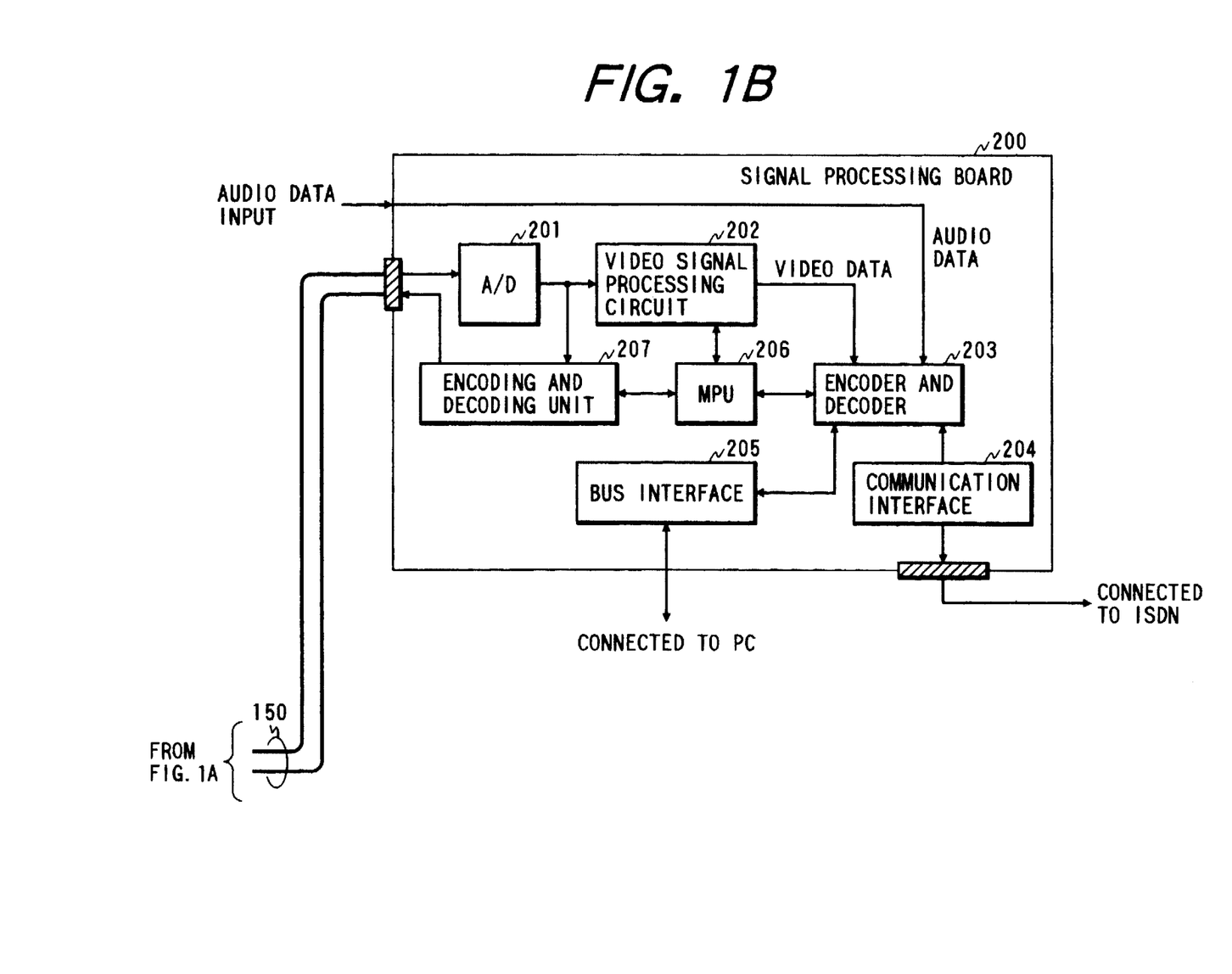

FIG. 1 is comprised of FIGS. 1A and 1B showing constructional block diagrams of a desk-top type television conference system using such a video camera of the camera head separating type. As shown in FIGS. 1A and 1B, the desk-top type television conference system is constructed by a camera head 100, a signal processing board 200, an electric tripod 300, and cables 150 and 160 for connecting them.

In the desk-top type television conference system shown in FIGS. 1A and 1B, first, processes in case of transmitting video and audio signals to a communication line will now be described.

In the camera head 100, an image is formed on an image pickup surface of an image pickup device (CCD) 103 through an image pickup optical system constructed by a pickup lens 101, an iris mechanism 102, and the like. A video signal corresponding to a video image formed on the image pickup surface is generated from the CCD 103. In a preprocessing circuit 104, preprocesses such as CDS (Correlation Double Sampling) process, AGC (Auto Gain Control) process, and the like are executed to the video signal. After that, the processed signal is transmitted to the signal processing board 200 through a multiplexing circuit 105 and the cable 150. In the signal processing board 200, the video signal that is supplied from the camera head 100 is converted into a digital signal by an analog/digital (A/D) converter 201. A color process and the like are executed in a state of the digital signal by a video signal processing circuit 202. After that, the signal is compressed in an encoder and decoder 203 together with audio data which is inputted from an outside The compressed signal is transmitted to a digital communication line such as an ISDN or the like through a communication interface 204.

On the other hand, processes in case of receiving data regarding video and audio signals transmitted through the communication line will now be described.

Data that is sent from the digital communication line such as an ISDN or the like is inputted to the signal processing board 200 through the communication interface 204 and is contrarily decompressed by the encoder and decoder 203. The decompressed video data and audio data are transferred to the PC via a bus interface 205 and are displayed and reproduced by a display apparatus and a speaker apparatus of the PC.

On the other hand, in order to move a photographing position of the camera head 100, the camera head 100 is attached onto the electric tripod 300. The electric tripod 300 is constructed in a manner such that the photographing position of the camera head 100 can be moved by making a pan motor 302 and a tilt motor 303 operative by an MPU (Micro Processor Unit) 301 in accordance with instructions of a pan operation and a tilt operation by control data that is supplied from the PC through the signal processing board 200, cable 150, camera head 100, and cable 160.

In the desk-top type television conference system using the video camera of the camera head separating type as mentioned above, in case of executing the camera control (namely, a focusing control, a zooming, an iris control, an electronic shutter control, a gain control, and the like) in the camera head 100 and the photographing position control (namely, pan operation, tilt operation) by the electric tripod, since the camera head 100 and signal processing board 200 or the electric tripod 300 and the PC are separated, various control data has to be communicated between an MPU 106 of the camera head 100 and an MPU 206 of the signal processing board 200.

As a cable which is provided between the camera head 100 and signal processing board 200 and is used to connect them, it is desirable that the number of wirings is as small as possible from a viewpoint of operability. Therefore, a method of reducing the number of wirings of the cable by multiplexing control data which is communicated between the camera head 100 and signal processing board 200 to the video signal and transmitting the multiplexed signal is used.

Namely, in the video camera of the camera head separating type, when the control data is transmitted from the signal processing board 200 to the camera head 100, the control data is transmitted via an exclusive-use cable. When the control data is transmitted from the camera head 100 to the signal processing board 200, on the other hand, by using a method called a VIDS (Vertical Interval Data Signal), the control data is multiplexed to the video signal and the multiplexed signal is transmitted through a cable for transmitting the video signal.

Figure 2:
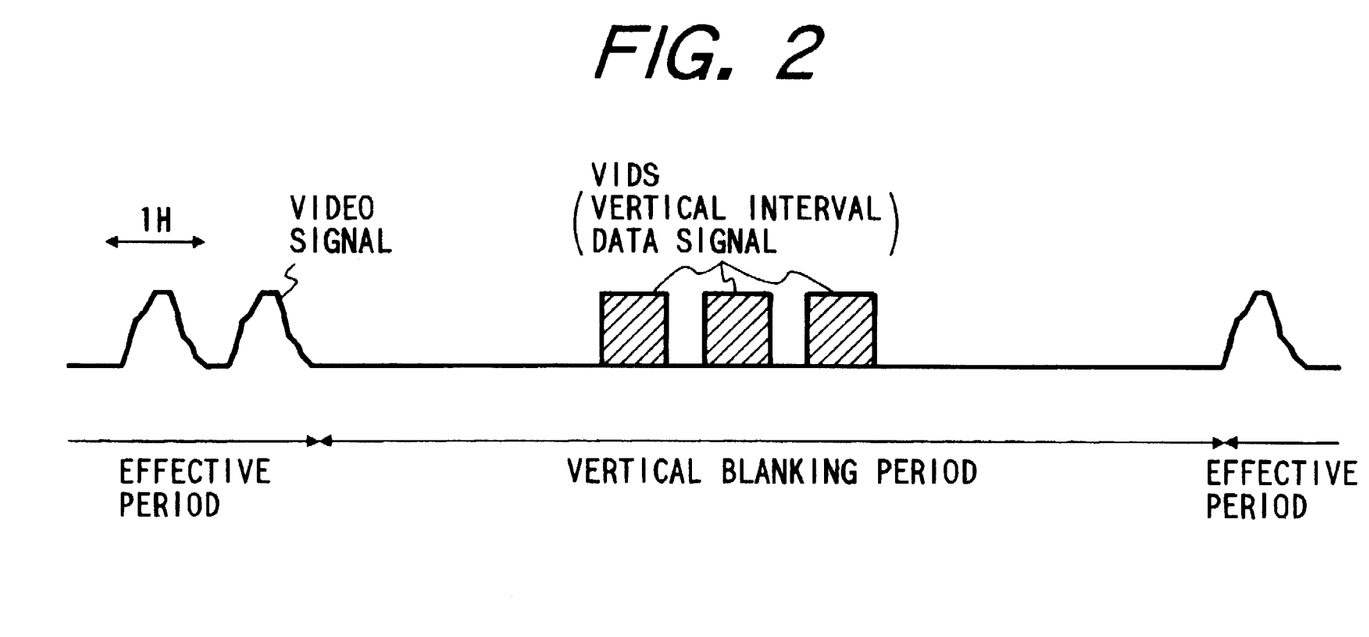
FIG. 2 is a diagram showing a multiplexing period of time of a VIDS.
Figure 3A:
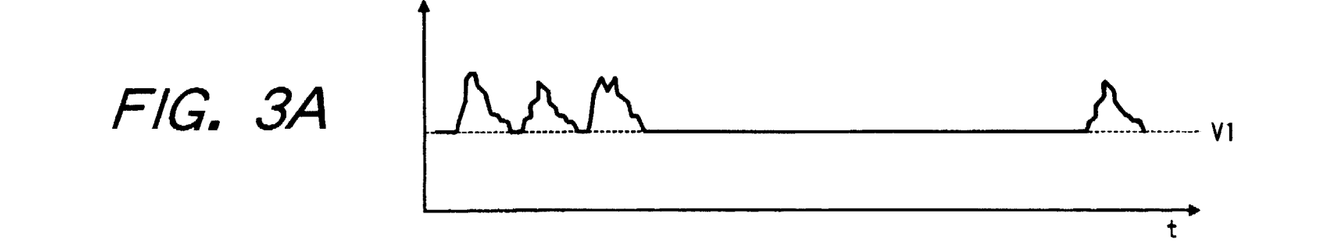
FIGS. 3A, 3B, 3C and 3D are timing charts for explaining the multiplexing operation of control data in the conventional system.
Figure 3B:
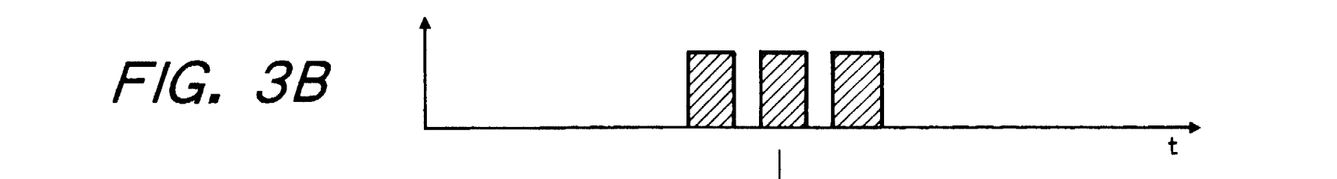
Figure 3C:
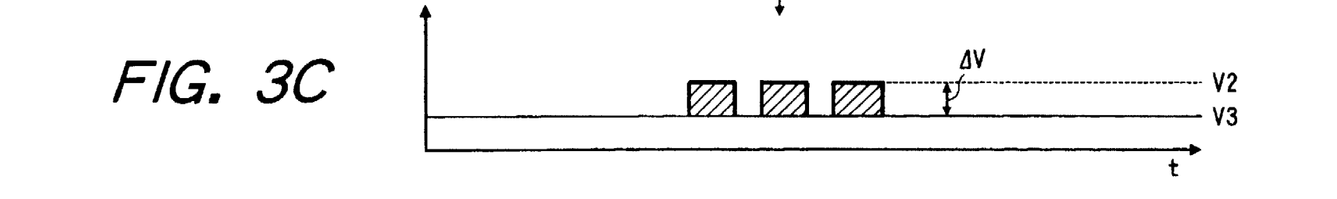
Figure 3D:
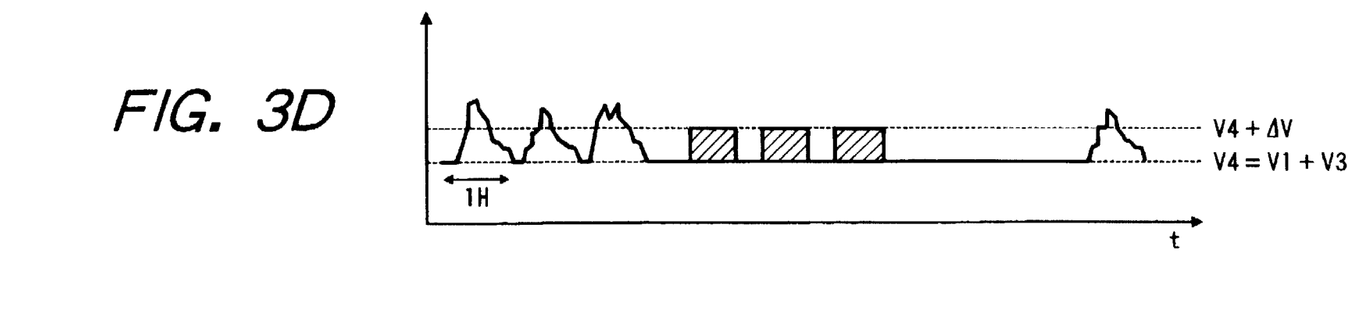

FIG. 2 shows a multiplexing period of time of the control data in case of using the above method. As shown in FIG. 2, the control data is added with an error check code by a binarization signal form of an NRZ and in this state, the control data is multiplexed to, for example, each horizontal scanning period of the video signal of a vertical blanking period (V blanking period).

Hitherto, in case of multiplexing the VIDS to the video signal as mentioned above, the multiplexing circuit 105 of the camera head 100 is constructed by using an operational amplifier. The multiplexing operation in the multiplexing circuit 105 using the operational amplifier will now be described with reference to time charts of FIGS. 3A, 3B, 3C and 3D.

In FIGS. 1A and 1B, the control data which is generated from the MPU 106 is converted into a binary signal (refer to FIG. 3A) in an encoding and decoding unit 107 and is, further, adjusted to a binary signal (VIDS) (refer to FIG. 3C) of a level that is actually multiplexed and is outputted to the multiplexing circuit 105 for, for example, the V blanking period of the video signal in accordance with a timing signal which is generated from a timing signal generator 108. The video signal (refer to FIG. 3A) which is supplied from the preprocessing circuit 104 and the level converted binary signal (refer to FIG. 3C) which is outputted from the encoding and decoding unit 107 are added by the multiplexing circuit 105 comprising a wide band operational amplifier. A resultant addition signal is outputted as a video and control data multiplexed signal (refer to FIG. 3D) to the signal processing board 200 through the cable 150.

The video and control data multiplexed signal which is supplied from the camera board 100 is converted into the digital signal by the A/D converter 201 of the signal processing board 200. The digital signal is supplied to both of the video signal processing circuit 202 and an encoding and decoding unit 207.

The encoding and decoding unit 207 separates and decodes the control data from the digital video and control data multiplexed signal which is supplied from the A/D converter 201. After that, the encoding and decoding unit 207 supplies the control data to the MPU 206 or encodes the control data which is outputted from the MPU 206 and supplies to the encoding and decoding unit 107 of the camera head 100 through a control data exclusive-use line of the cable 150.

In the above conventional system, however, since the control data is multiplexed by constructing as mentioned above, a number of parts such as operational amplifier, level control circuit, peripheral circuits of those circuits, and the like are necessary to construct the encoding and decoding unit 107 and multiplexing circuit 105, so that the circuit is complicated and the scale is large. Since the multiplexing circuit for multiplexing the control data needs to use the wide band operational amplifier (in case of the video signal, a band of about 100 MHz is necessary), there is a problem such that the costs of the system are high.

SUMMARY OF THE INVENTION

It is an object of the invention to provide a video signal processing apparatus which can solve the foregoing problems.

Another object of the invention is to provide a video signal processing apparatus which can realize a function for multiplexing a data signal to a video signal and transmitting a multiplexed signal by a circuit of a cheap and simple construction of a small scale.

To accomplish the above objects, according to one preferred embodiment of the invention, there is provided a video signal processing apparatus comprising:

an image pickup unit for picking up an image of an object and generating a video signal corresponding to the picked-up object image;

a signal processing unit for performing various signal processes to the video signal which is generated from the image pickup unit;

a cable for electrically connecting the image pickup unit and the signal processing unit; and data signal multiplexing means for multiplexing data signal to the video signal by switching and outputting a plurality of kinds of video signals having different DC potentials in accordance with the data signal for a predetermined period of time of the video signal that is transmitted from the image pickup unit to the signal processing unit through the cable in order to transmit and receive the data signal between the image pickup unit and the signal processing unit through the cable.

Still another object of the invention is to provide a video signal generating apparatus which can multiplex a video signal and a data signal and can generate a multiplexed signal by a circuit of a cheap and simple construction of a small scale.

To accomplish the above object, according to one preferred embodiment of the invention, there is provided a video signal generating apparatus comprising:

an image pickup unit for picking up an image of an object and generating a video signal corresponding to the picked-up object image;

a data signal generating unit for generating a data signal; and a video signal output unit for inputting the video signal that is generated from the image pickup unit, forming a plurality of kinds of video signals of different DC potentials from the input video signal, and switching and outputting the plurality of kinds of video signals which are formed in accordance with the data signal that is generated from the data signal generating unit for a predetermined period of time.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described in detail hereinbelow.

Figures 4, 4A:
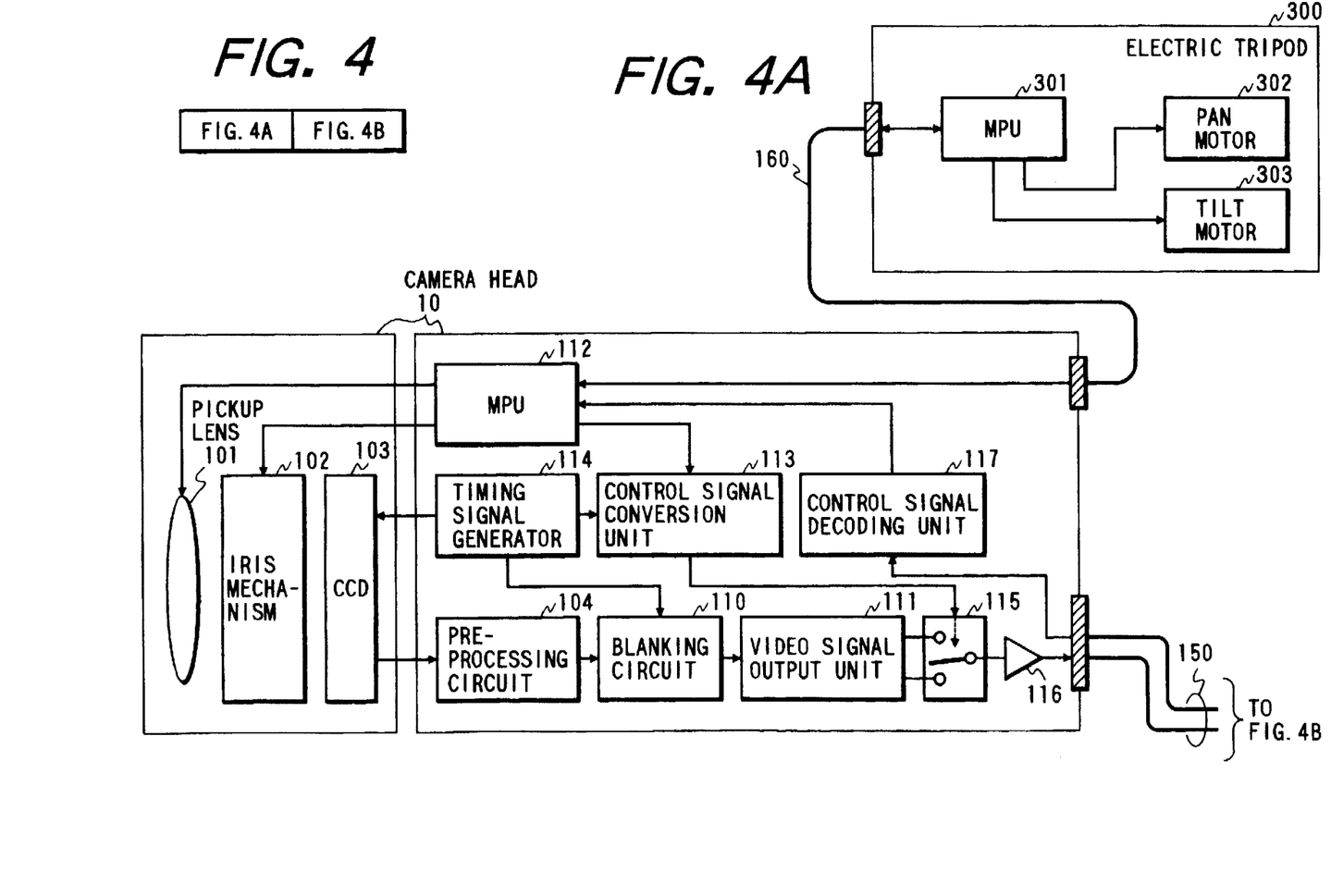
FIG. 4 is comprised of FIGS. 4A and 4B showing block diagrams illustrating a construction of a desk-top type television conference system using a video camera of a camera head separating type according to an embodiment of the invention.
Figure 4B:
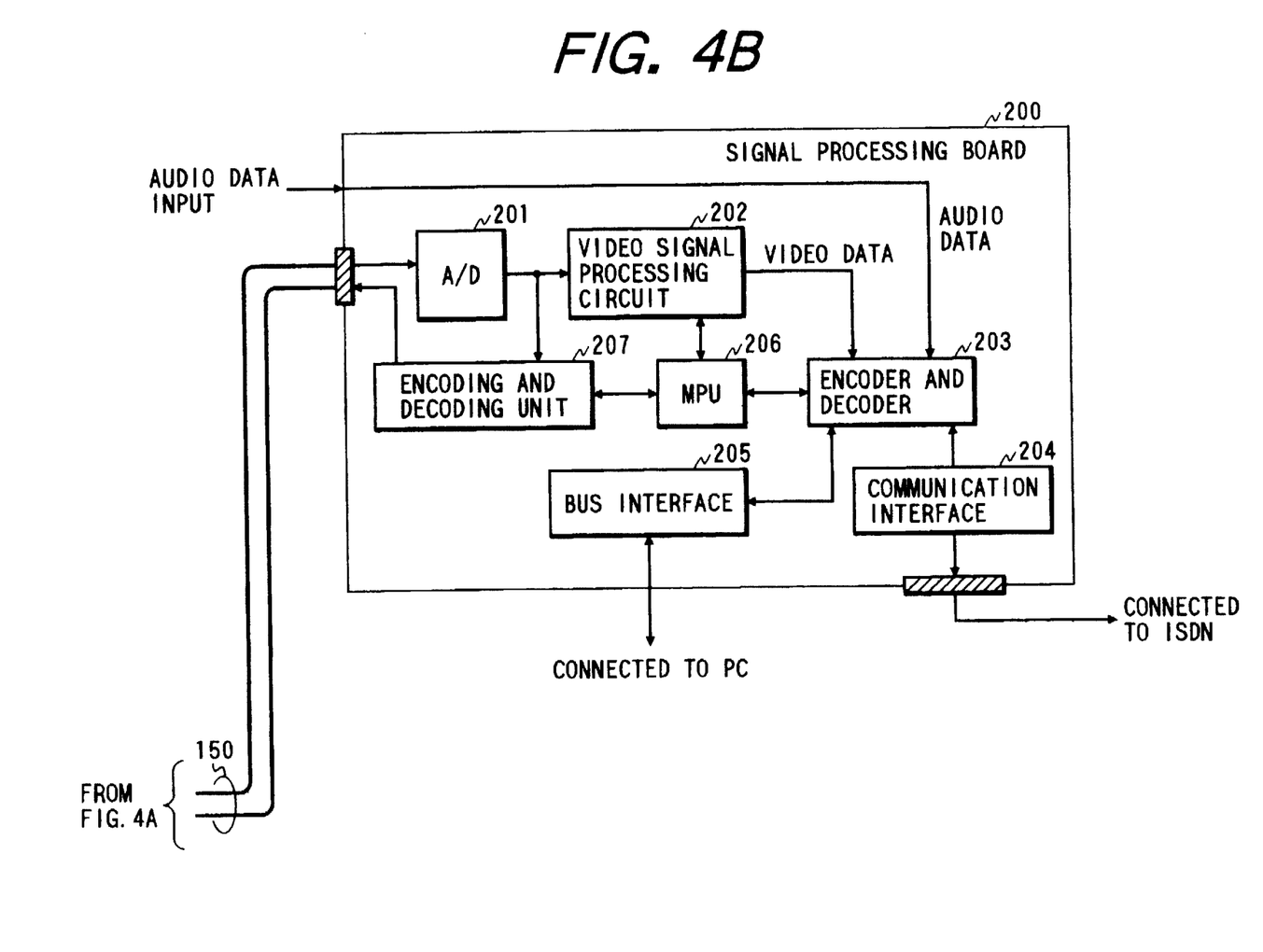

FIGS. 4A and 4B are block diagrams showing a construction of a television conference system of a desk-top type using a video camera of a camera head separating type according to an embodiment of the invention. In the system shown in FIGS. 4A and 4B, component elements similar to those in the system shown in FIGS. 1A and 1B are designated by the same reference numerals and their detailed descriptions are omitted here.

In the system shown in FIGS. 4A and 4B, a camera head 10 and the signal processing board 200 are mutually connected by the cable 150. With respect to the control data, the control data (hereinafter, referred to as "VIDS[b]") which is transmitted from the signal processing board 200 to the camera head 10 is transmitted through an exclusive-use cable and is decoded by a control signal decoding unit 117 of the camera head 10 and is supplied to an MPU 112. As for the control data (hereinafter, referred to as a "VIDS[a]") which is transmitted from the camera head 10 to the signal processing board 200, the control data is multiplexed to the video signal and the multiplexed signal is transmitted through a cable for transmitting the video signal.

Since the control data (VIDS[b]) which is transmitted from the signal processing board 200 to the camera head 10 is transmitted through the exclusive-use cable, it can be transmitted for an arbitrary period of time. However, in order to avoid an influence on the video signal by a crosstalk to another cable such as a cable for video signal transmission or the like, the control data (VIDS[b]) is transmitted for the same period of time as that of the control data (VIDS[a]) which is transmitted from the camera head 10 to the signal processing board 200. Namely, by transmitting both of the control data VIDS[a] and VIDS[b] for a non-video period of time (for example, vertical blanking period or the like), it is prevented that the control data VIDS exerts an adverse influence on the video signal as noises.

A construction to execute a multiplexing process of the control data (VIDS[a]) which is transmitted from the camera head 10 to the signal processing board 200 will now be described.

In FIGS. 1A and 1B, the video signal which is generated from the CCD (Charge Coupled Device) 103 is subjected to preprocesses such as sampling and holding, gain control, and the like in the preprocessing circuit 104. After that, a DC coupling and a blanking period formation which are necessary for multiplexing the data are executed in a blanking circuit 110 and the resultant signal is supplied to a video signal output unit 111.

Figure 5:
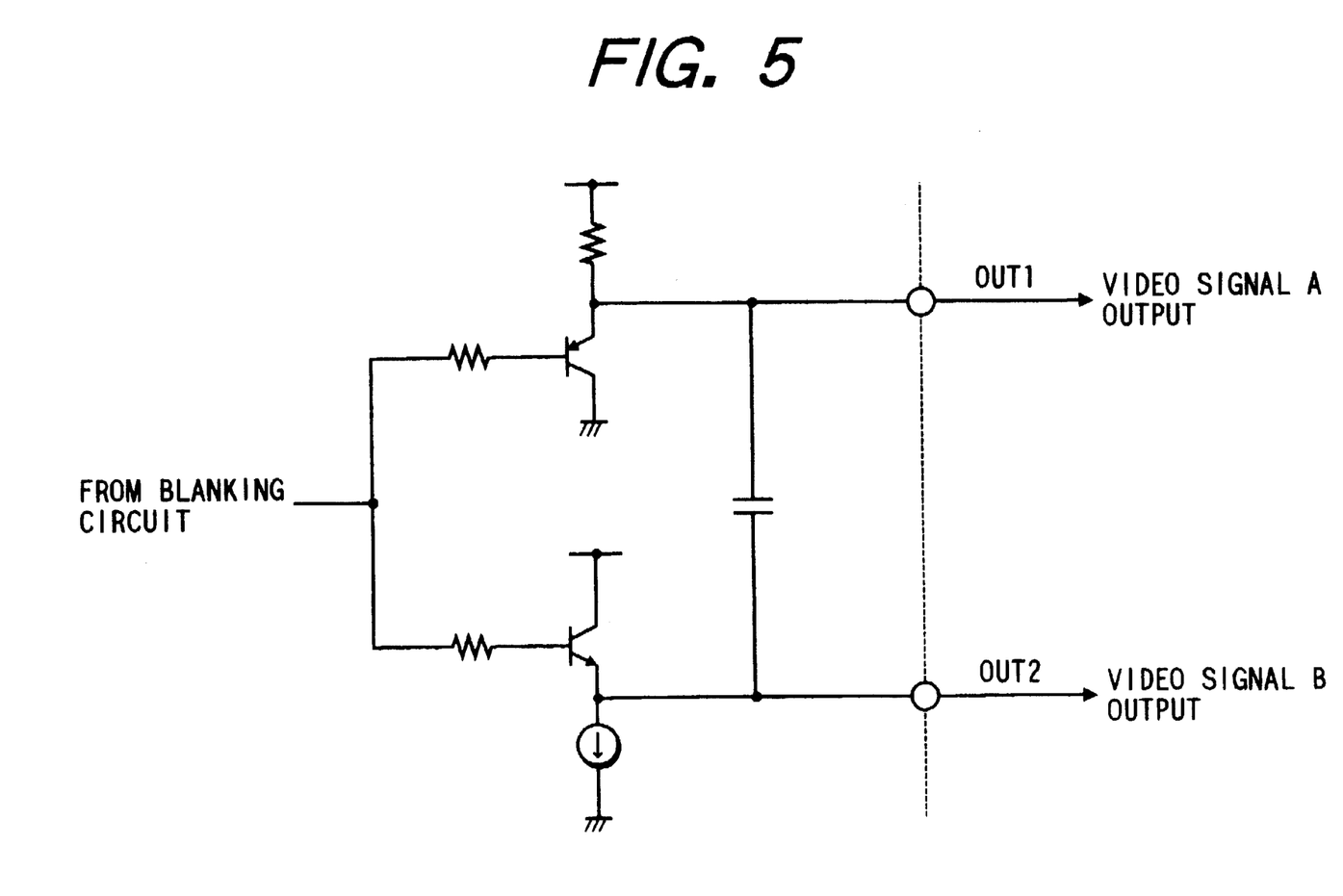
FIG. 5 is a diagram showing an equivalent circuit of a video signal output unit in FIGS. 1A and 1B.

The video signal output unit 111 has a push-pull construction of a capacitor coupling type as shown in an equivalent circuit of FIG. 5 and generates two kinds of video signals A and B of different DC potentials. As such two kinds of video signals A and B, signals which are outputted from two output terminals OUT1 and OUT2 of the push-pull construction are used.

In the push-pull construction of the capacitor coupling type, it is necessary that the video signal A has a predetermined DC potential difference for the video signal B. It is now assumed that the DC potential of the video signal A is set to Va and the DC potential of the video signal B is set to Vb (the higher DC potential is set to Va) and the predetermined DC potential difference between the two kinds of video signals A and B is set to ΔV (=Va−Vb=constant).

The camera head 10 has the MPU 112 and a control signal conversion unit 113.

The control signal conversion unit 113 converts the control data which is supplied from the MPU 112 into a VIDS (Vertical Interval Data Signal) in which data exists in only a multiplexing region. Namely, the control signal conversion unit 113 once stores the input control data into a buffer and outputs a binary signal to the multiplexing region (namely, vertical blanking period) detected by using a horizontal sync signal, a vertical sync signal, and a reference clock which are supplied from a timing signal generator 114.

A signal multiplexing unit 115 is constructed by a switch having two inputs and one output. The switch of the signal multiplexing unit 115 inputs the two kinds of video signals A and B from the video signal output unit 111 and switches the two kinds of video signals A and B by using the VIDS from the control signal conversion unit 113 as a switching control signal and generates the switched video signal. That is, the switch of the signal multiplexing unit 115 switches the two kinds of video signals A and B from the video signal output unit 111 in accordance with the high and low levels of the VIDS as an output of the control signal conversion unit 113.

As for a relation of the output for the VIDS (switching control signal) of the switch of the signal multiplexing unit 115, as shown in the following Table 1, the video signal B is selected and outputted when the VIDS (switching control signal) is at the low level and the video signal A is selected and outputted when the VIDS is at the high level. Thus, the VIDS is multiplexed to the vertical blanking period of the video signal and is outputted to the signal processing board 200 through a driver 116 and the cable 150. As a switch of such a signal multiplexing unit 115, a cheap general analog switch can be properly used.

TABLE 1

| Switching control signal | Output of switch |
|---|---|
| Low level | Video signal B |
| High level | Video signal A |

The multiplex processing operation of the control data (VIDS[a]) which is transmitted from the camera head 10 to the signal processing board 200 will now be described.

In FIG. 4A, in the camera head 10, preprocesses such as CDS (Correlation Double Sampling), AGC (Auto Gain Control), and the like are executed to the video signal which is supplied from the CCD 103 by the preprocessing unit 104. Further, the DC coupling and the blanking period formation which are necessary for multiplexing the data are executed by the blanking circuit 110. The two kinds of video signals A and B are generated from the video signal output unit 111.

On the other hand, the control signal conversion unit 113 once stores the control data which is supplied from the MPU 112 into a buffer and generates the data into the multiplexing region (namely, vertical blanking period) detected by using the horizontal sync signal, vertical sync signal, and reference clock which are supplied from the timing signal generator 114. In this manner, the binary signal (VIDS) in which the data exists in only the multiplexing period of time is formed.

Figure 6:
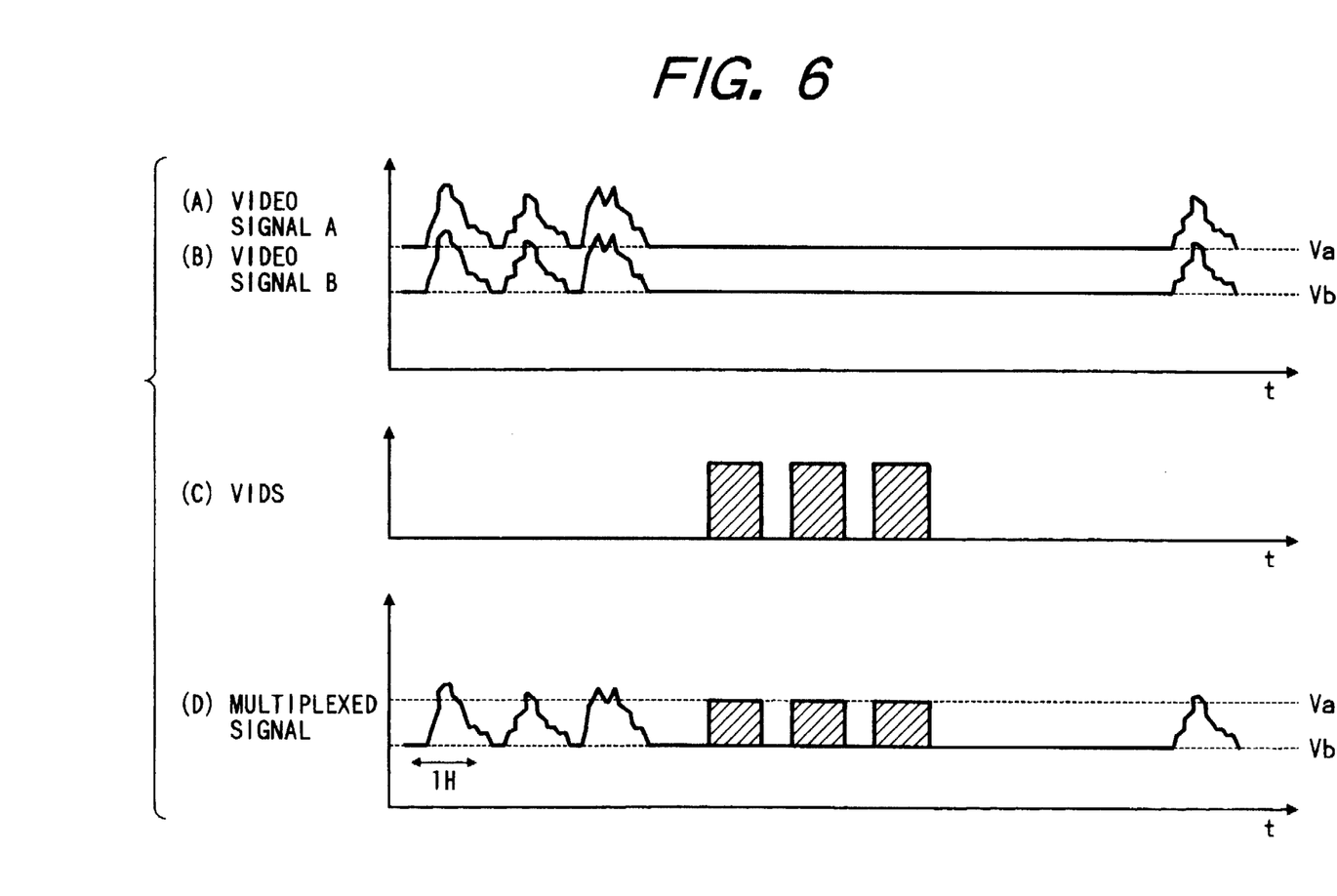
FIG. 6 is a timing chart for explaining the multiplexing operation of control data in the system according to the embodiment of the invention.

The operation of the signal multiplexing unit 115 will now be described with reference to FIG. 6. FIG. 6 is a time chart showing the operation of the signal multiplexing unit 115. FIG. 6 shows a state in which the control data is multiplexed to the video signal by the switching operation of the switch of the signal multiplexing unit 115. In the diagram, (A) and (B) show the two kinds of video signals A and B from the video signal output unit 111, (C) shows the VIDS, and (D) shows the multiplexed signal (namely, output of the signal multiplexing unit 115) of the signals shown in (A), (B) and (C). Since the VIDS of (C) is at the low level for a period of time other than the multiplexing period of time, the video signal B as an input to the switch of the signal multiplexing unit 115 is generated. In the multiplexing period of time, when the VIDS is at the low level, the video signal B as an input to the switch of the signal multiplexing unit 115 is generated and, when the VIDS is at the high level, the video signal A as an input to the switch of the signal multiplexing unit 115 is generated. The signal which is generated by such operations is as shown in (D) and a form such that the VIDS is multiplexed to the video signal is obtained.

According to the desk-top type television conference system using the video camera of the camera head separating type according to the embodiment of the invention as mentioned above, two kinds of video signals A and B are switched in accordance with the level of the binary signal (VIDS) and the binary signal is multiplexed for a specific period of time of the video signals A and B. Therefore, the level control circuit and expensive operational amplifier which were conventionally used are unnecessary and the circuit can be simplified, so that a video camera of the camera head separating type can be realized by the circuit construction of low costs and a small scale. Since the video signal output unit of the camera head has the push-pull construction of the capacitor coupling type, response speeds of the two kinds of video signals as output signals can be improved.

invention is not limited to the embodiment as mentioned above but can be also applied to other various embodiments.

According to the invention as described above, a video signal processing apparatus which can realize the function for multiplexing the data signal to the video signal and transmitting the multiplexed signal by a circuit of a cheap and simple construction of a small scale.

Many widely different embodiments of the present invention may be constructed without departing from the spirit and scope of the present invention. It should be understood that the present invention is not limited to the specific embodiments described in the specification, except as defined in the appended claims.

What is claimed is:

1. A video signal processing apparatus comprising:

an image pickup unit for picking up an image of an object and generating a video signal corresponding to said picked-up object image;

a signal processing unit for performing various signal processes to the video signal which is generated from said image pickup unit;

(C) a cable for electrically connecting said image pickup unit and said signal processing unit; and (D) data signal multiplexing means for multiplexing a data signal to said video signal by switching a plurality of kinds of video signals of different DC potential in accordance with said data signal and outputting for a predetermined period of time of the video signal which is transmitted from said image pickup unit to said signal processing unit through said cable in order to transmit and receive the data signal between said image pickup unit and said signal processing unit through said cable.

2. An apparatus according to claim 1, wherein said data multiplexing means includes:

(a) video signal generating means for generating two kinds of video signals of different DC potentials;

(b) binary signal generating means for generating a binary signal obtained by binarizing said data signal for a predetermined period of time of said video signal; and (c) video signal output means for receiving said two kinds of video signals which are generated from said video signal generating means and said binary signal which is generated from said binary signal generating means, switching said two kinds of video signals in accordance with a level of said binary signal, and outputting the switched video signal.

3. An apparatus according to claim 2, wherein said video signal generating means has a push-pull construction of a capacitor coupling type.

4. An apparatus according to claim 1, wherein in order to transmit and receive the data signal between said image pickup unit and said signal processing unit through said cable, said data signal multiplexing means is arranged in a manner such that for the predetermined period of time of the video signal which is transmitted from said image pickup unit to said signal processing unit through said cable, said two kinds of video signals of different DC potentials are switched and outputted in accordance with a level of a binarized data signal so as to output the video signal of the lower potential for a period of time during which the level of said binarized data signal is low and to output the video signal of the higher potential for a period of time during which the level of said binarized data signal is high, thereby multiplexing said data signal to said video signal.

5. An apparatus according to claim 2, wherein said binary signal generating means is arranged so as to generate the binary signal for a vertical blanking period of the video signal.

6. A video signal generating apparatus comprising:

(A) an image pickup unit for picking up an image of an object and generating a video signal corresponding to said picked-up object image;

(B) a data signal generating unit for generating a data signal; and (C) a video signal output unit for inputting the video signal which is outputted from said image pickup unit, forming a plurality of kinds of video signals of different DC potentials from said input video signal, switching said plurality of kinds of video signals which are formed for a predetermined period of time in accordance with the data signal which is generated from said data signal generating unit, and outputting the switched video signal.

7. An apparatus according to claim 6, wherein said video signal output unit includes:

(a) video signal generating means for generating two kinds of video signals of different DC potentials;

(b) binary signal generating means for generating a binary signal obtained by binarizing the data signal which is generated from said data signal generating unit for a predetermined period of time of said video signal; and (c) video signal output means for receiving said two kinds of video signals which are generated from said video signal generating means and said binary signal which is generated from said binary signal generating means, switching said two kinds of video signals in accordance with a level of said binary signal, and outputting the switched video signal.

8. An apparatus according to claim 7, wherein said video signal generating means has a push-pull construction of a capacitor coupling type.

9. An apparatus according to claim 6, wherein said video signal output unit is arranged in a manner such that the video signal which is generated from said image pickup unit is inputted, two kinds of video signals of different DC potentials are formed from the video signal which is inputted, said two kinds of video signals which are formed are switched and outputted for a predetermined period of time in accordance with a level of a binary signal obtained by binarizing the data signal which is generated from said data signal generating unit so as to output the video signal of the lower potential for a period of time during which the level of said binary signal is low and to output the video signal of the higher potential for a period of time during which the level of said binary signal is high, thereby multiplexing said data signal to said video signal.

10. An apparatus according to claim 7, wherein said binary signal generating means is arranged so as to generate the binary signal for a vertical blanking period of the video signal.

* * * * *